Dec. 20, 1949     W. E. CLAUS     2,491,892
ROTARY SOIL TILLER

Filed Nov. 29, 1944                        5 Sheets-Sheet 1

Inventor
Walter E. Claus

Dec. 20, 1949 W. E. CLAUS 2,491,892
ROTARY SOIL TILLER
Filed Nov. 29, 1944 5 Sheets-Sheet 2

Inventor
Walter E. Claus

Dec. 20, 1949 W. E. CLAUS 2,491,892
ROTARY SOIL TILLER
Filed Nov. 29, 1944 5 Sheets-Sheet 4

Inventor
Walter E. Claus
By Ira Hulton Jones
O. Wormey

Dec. 20, 1949 W. E. CLAUS 2,491,892
ROTARY SOIL TILLER

Filed Nov. 29, 1944 5 Sheets-Sheet 5

Inventor
Walter E. Claus

Patented Dec. 20, 1949

2,491,892

UNITED STATES PATENT OFFICE 2,491,892

ROTARY SOIL TILLER

Walter E. Claus, Milwaukee, Wis.

Application November 29, 1944, Serial No. 565,607

5 Claims. (Cl. 97—212)

This invention relates to agricultural implements and refers particularly to a rotary soil tiller.

Heretofore the design of rotary soil tillers has been dictated largely by the impression that the soil working tines either had to be resilient themselves, or resiliently mounted to satisfactorily cope with obstructions apt to be encountered in the ground, but the incorporation of such resiliency in the tines or their mounting is objectionable.

It is therefore an object of the present invention to provide a rotary soil tiller wherein the objections inherent in resilient tines or resiliently mounted tines is overcome by the substitution of a rotor having rigid tines rigidly mounted and so designed that relatively small obstructions like stones are shifted laterally as they are encountered, while larger obstructions are accommodated by the rotor lifting itself thereover.

It has been also found that the tine designs heretofore employed were largely responsible for the relatively large power requirements of past machines of this type. The present invention achieves a substantial advantage in this respect through the use of tines which have sharp narrow cutting portions easily driven through the soil cooperating with beater portions adapted to break up and pulverize the soil loosened by the cutting portions.

More specifically it is an object of this invention to provide a soil tilling rotor in which all of the tines move edgewise through the soil and in which the axial spacing and relationship of the tines is such that as the rotor revolves each tine strikes the "land" left between the axially spaced grooves cut by two preceding tines to thus more or less explode this "land."

Another object of this invention is to provide a soil tilling rotor which though of relatively small diameter, nevertheless will cut to a substantial depth.

A further object of this invention is to provide a soil tilling rotor which is self cleaning and will not be fouled up by an accumulation of roots and trash.

A further object of this invention is to provide a machine of the character described which is so balanced that it is easily manipulated and whereby immovable and large obstructions encountered by the tines of the rotor may freely cause the rotor to lift itself over the obstruction.

A still further object of this invention is to provide a soil tiller of the character described which is rugged in construction and simple in design so as to lend itself readily to the work for which it is intended.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Figure 1:
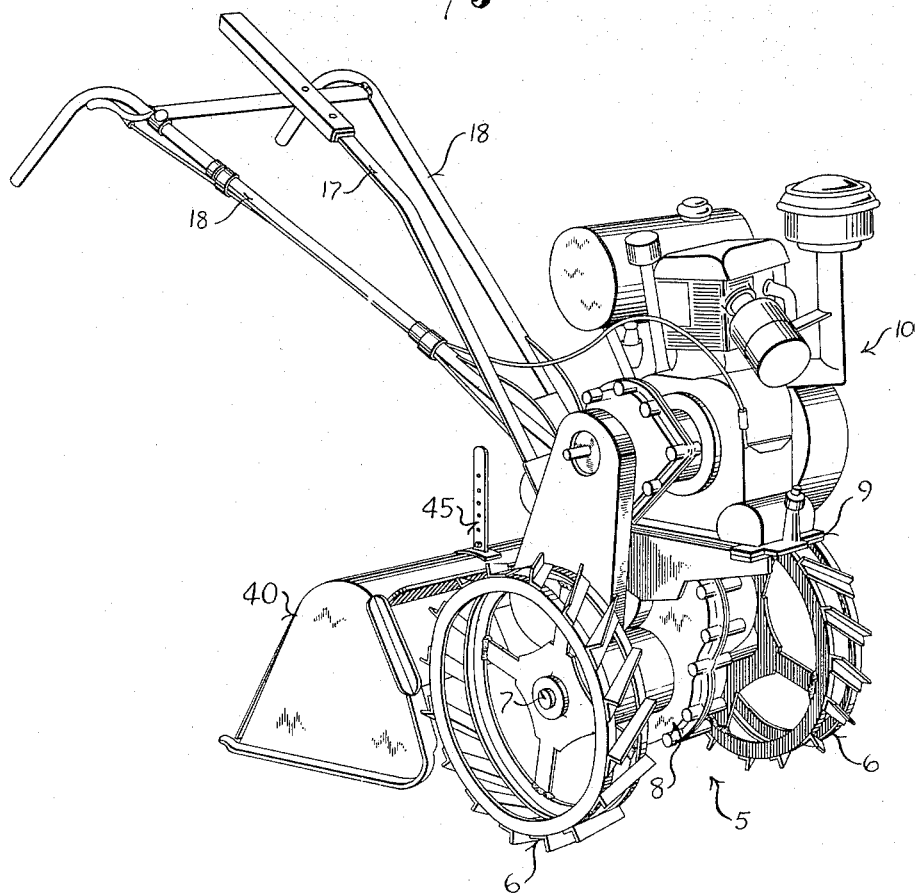
Figure 1 is a perspective view of a rotary soil tiller embodying this invention.
Figure 2:
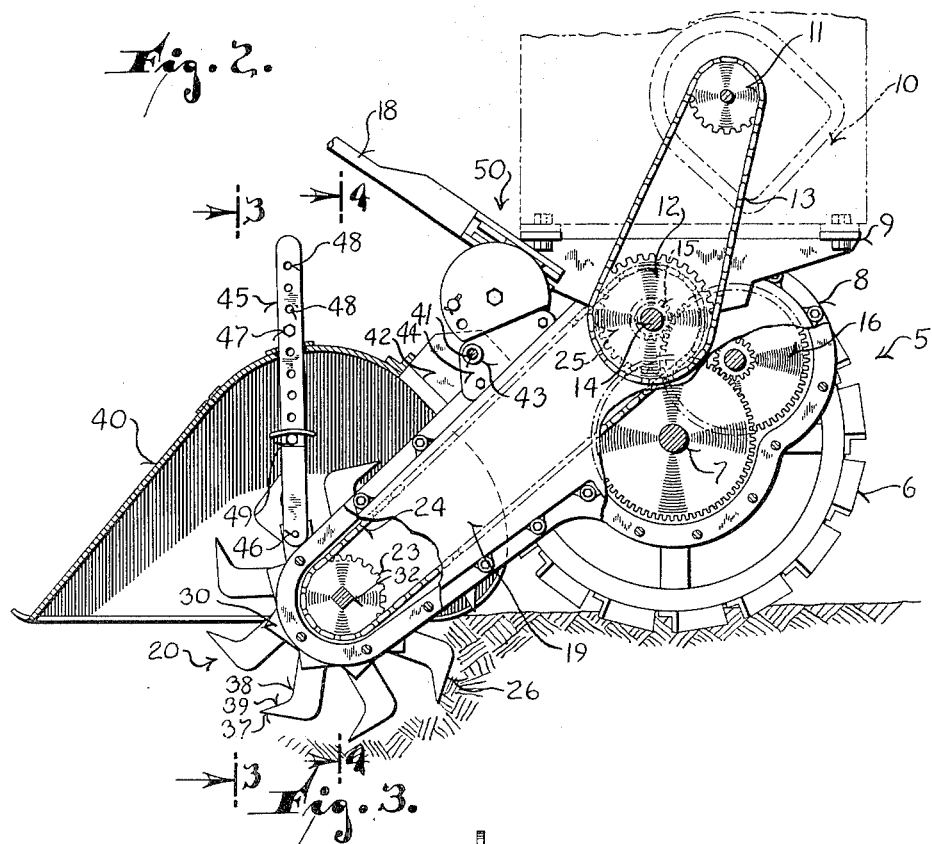
Figure 2 is a view in longitudinal section through the entire machine, but with its power plant merely indicated in broken lines.

Referring now particularly to the accompanying drawings, in which like numerals indicate like parts, the numeral 5 designates generally the frame of a rotary soil tiller which is supported by a pair of traction wheels 6, the entire machine being substantially balanced about the axle 7 of these traction wheels. The frame 5 includes a gear case or housing 8 composed of two complementary hollow sections bolted together on a median vertical plane. Supported on top of this gear case is a platform 9 on which an engine 10 is mounted.

A power transmitting connection including sprockets 11 and 12 drivingly connected by a chain 13 provides a drive from the engine to a shaft 14 journalled in the gear case. This shaft has a pinion 15 mounted thereon which, under control of a clutch (not shown) provides a drive to a gear train 16 through which power is carried to the traction wheels at appropriately reduced speed. A manually operable handle 17 projecting upwardly and rearwardly adjacent to the handles 18 by which the machine is controlled provides for engaging and disengaging the clutch controlling the power transmission to the traction wheels.

The gear case 8 has a narrow downwardly extending trailing portion 19 the lower end of which carries a rotor indicated generally by the numeral 20. A hub 21 journalled in bearings 22 seated in pockets in the opposite side walls of the lower end of the gear case directly carries and drives the rotor. It is to be observed that the ends of the hub 21 project slightly beyond the adjacent ends of the housing in which the bearings are received. This hub has a sprocket 23 fixed thereto and drivingly connected with the shaft 14 through a sprocket chain 24 meshing with the sprocket 23 and a sprocket 25 fixed to the shaft 14.

The specific construction of the rotor plays an important part in achieving the advantages and objectives of this invention. Its tines 26 are rigid and are rigidly mounted. This desirable construction is made possible because of the particular design of the tines and the manner in which the machine is balanced.

Figures 7, 8, 9:
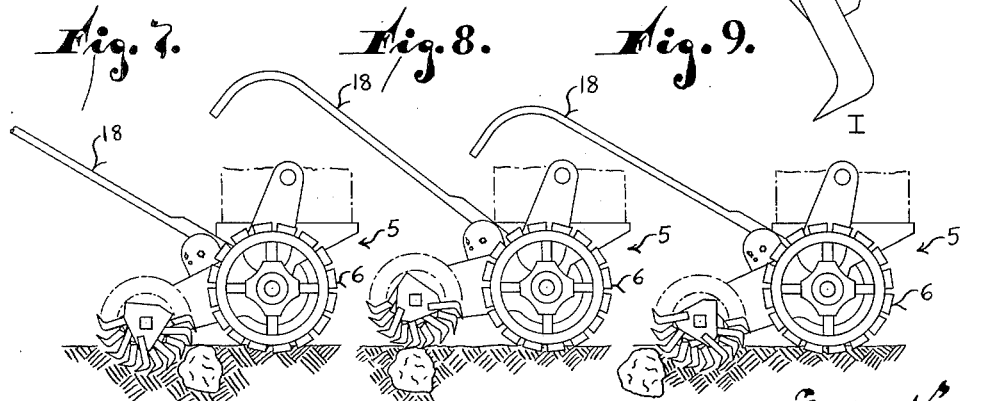
Figures 7, 8 and 9 are views diagrammatically illustrating the manner in which the rotor lifts itself over an obstruction.

Obstructions encountered by the tines as the rotor revolves and the machine moves forwardly, if small enough are merely pushed laterally to pass between the tines, but if large and relatively immovable, the rotor lifts itself over the obstruction, as clearly illustrated in Figures 7, 8 and 9.

Figure 5:
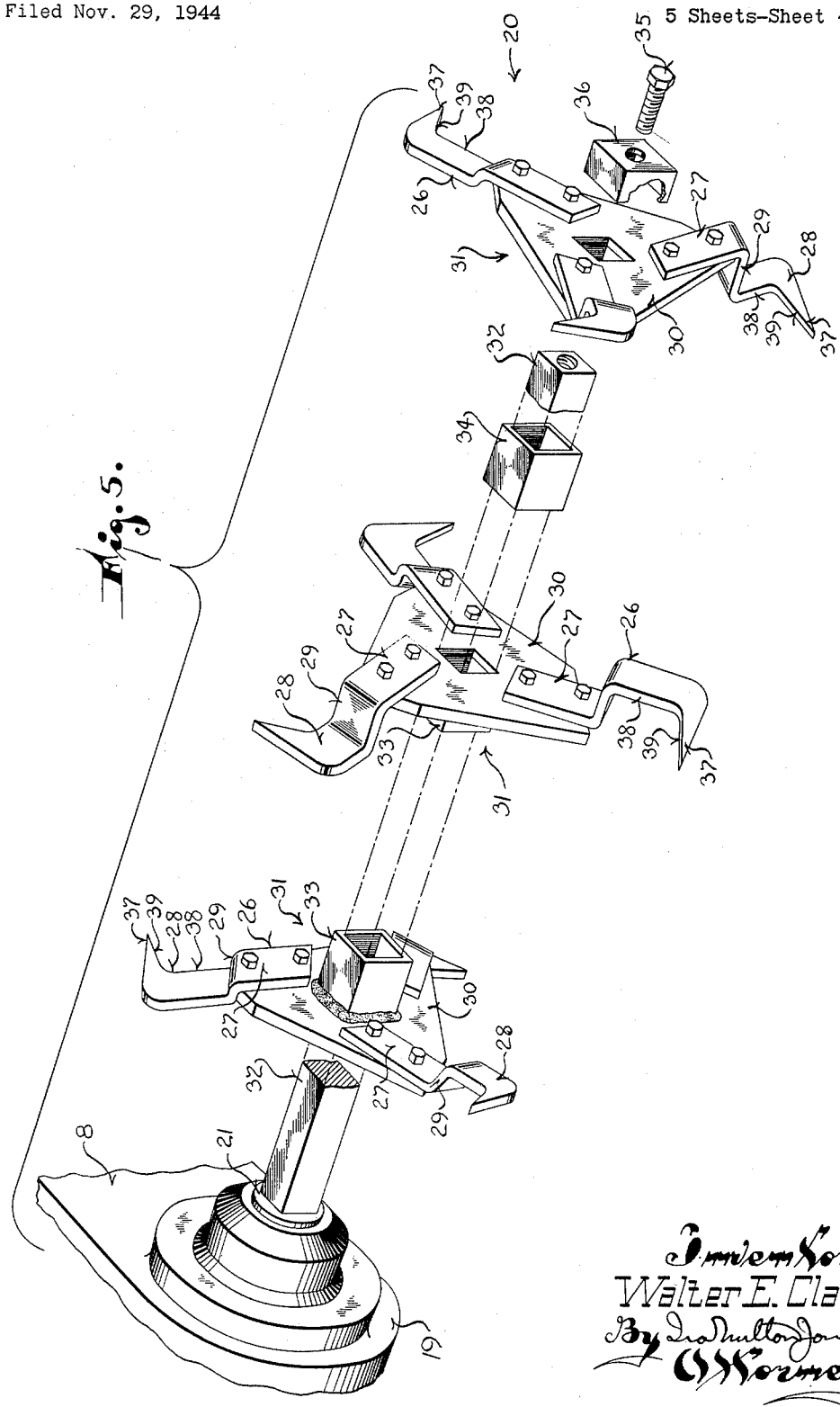
Figure 5 is a perspective view of one end portion of the rotor with the parts thereof disassembled.

The individual tines, as best shown in Figure 5, have attaching portions 27 and cutting portions 28 offset as at 29. The extent of the offset varies so that three or more tines with different amounts of offset and all secured to one flange 30 constitute a set or group of tines capable of covering a substantial width. By virtue of this variation in the amount of offset in the tines the cutting portion 28 of each travels in a separate plane normal to the axis of rotation but collectively the tines cut a swath of substantial width.

Several sets of tines are mounted at each side of the machine by means of a polygonal shaft or spindle 32 freely received in a correspondingly shaped hole extending axially through the hub 21. The supporting member 31 of each set or group of tines has a hub portion 33 the hole of which has the same polygonal shape as the shaft 32 to freely slidably receive the same and thereby secure the tines against rotation with respect to the shaft.

It is to be noted that the hub portion 33 of each supporting member 31 appears only at one face of the flange 30. Thus, through the use of spacers 34, which may be of different lengths but which have a cross section substantially the same as that of the hub portions 33, the several sets or groups of tines may be assembled with different spacings therebetween. Collectively the groups of tines and the spacers cover the entire projecting end portions of the shaft 32 with the innermost members, preferably flanges 30, bearing against the exposed ends of the hub 21.

The parts are held in this assembled relation by clamping screws 35 threaded into the ends of the shaft 32 and provided with caps 36 bearing against the endmost units of the assembly. Tightening the screws 35 draws the several parts of the assembly tightly together and collectively clamps the same against the ends of the hub 21. This not only secures the tines to the driving shaft or spindle 32 but also reinforces and strengthens this shaft.

Attention is also directed to the fact that by virtue of this arrangement the rotor may be assembled off center where special work calls for his arrangement; that is, the shaft 32 may project farther in one direction than in the other direction and more time units may be mounted on the former than on the latter shaft extension.

Likewise the replacement of any rotor part is readily and quickly accomplished with this construction, for merely by loosening the clamp screws 35 all of the tine assemblies become instantly removable, and even the shaft 32 may be pulled out of its driving hub 21.

Each tine has a cutting point 37 projecting forwardly from its leading edge 38. The angle formed between the leading edge 38 and the inner or active edge 39 of the cutting point is obtuse. This, together with the specific manner in which the tines are located with respect to the axis of the rotor, achieves the desirable result of causing roots and other similar obstructions picked up by the rotor to be thrown radially outwardly to avoid their becoming entangled in the rotor.

Figure 6:
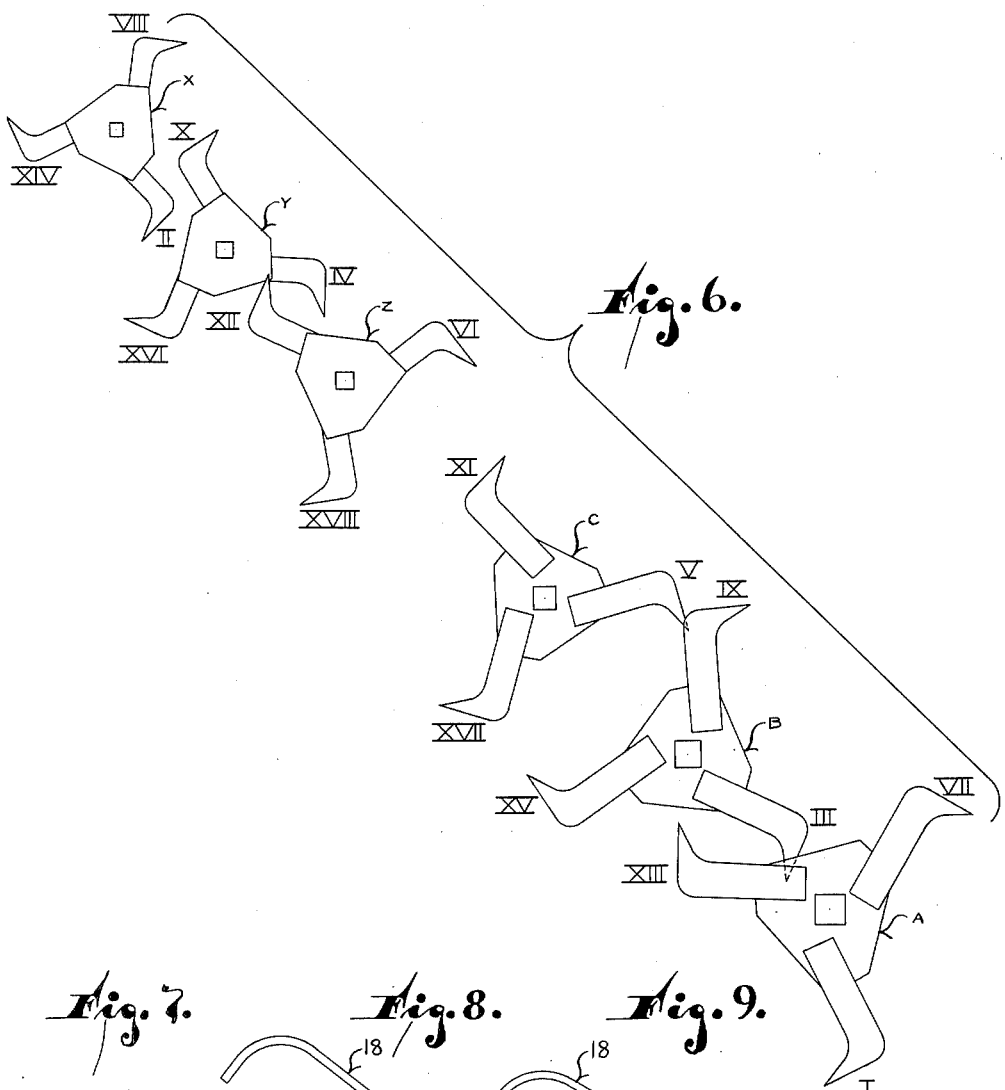
Figure 6 is a diagrammatic view illustrating the relationship between the tines of the rotor and their progression of soil engagement.

As best shown in Figure 6, the leading edges 38 of the tines are not radial to the rotor axis but instead are tangent to a circle struck from the rotor axis at that point with relation to the direction of rotation that the leading edges form a receding angle to the ground as they come down into engagement therewith.

Another manner of specifically defining the relationship by which the desired result is achieved is as follows: a line drawn from the extreme point of a tine to the rotor axis intersects the plane of the leading edge, with the point of intersection approximately at the offset 29.

The length of the cutting portions 28 of the tines and the speed of rotation of the rotor is so coordinated with the speed of the propulsion mechanism and thus the rate of travel of the machine along the ground that the fresh soil is cut up only by the cutting portions of the tines, while the offsets 29, serving as beaters, break up the loosened soil. This keeps the power requirements at a minimum as edgewise movement of the cutting portions (with their sharp points) through the soil is materially easier than carrying the lateral offsets 29 through the soil.

The relatively small diameter of the rotor is another explanation for the power economy which characterizes this invention. Since the tine carriers are flat discs the rotor may be lowered into the ground clear up to its shaft. Thus, while the tines project but a relatively short radial distance from the carriers, being more or less tangential thereto, which makes the overall diameter of the rotor small, tilling to the desired maximum depth is possible. Moreover it should be noted that the edgewise disposition of the tine carriers and the placement of the tines thereon precludes the accumulation of trash on the rotor even when it is lowered into the soil clear up to the axle.

Figure 3:
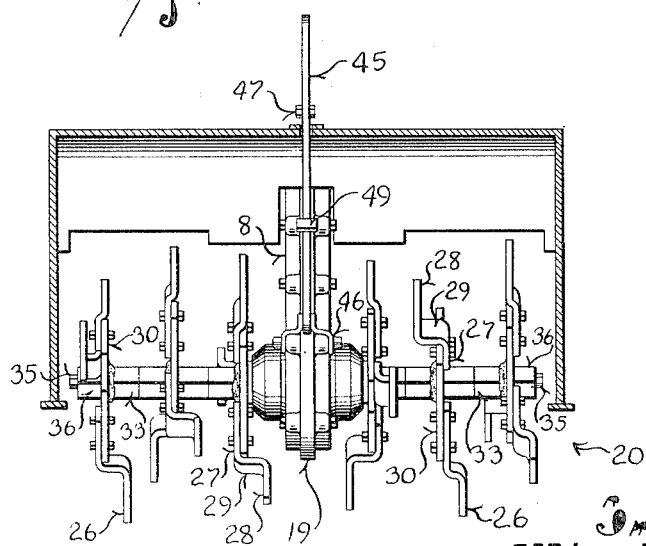
Figure 3 is a cross sectional view taken through Figure 2 on the plane of the line 3—3.
Figure 4:
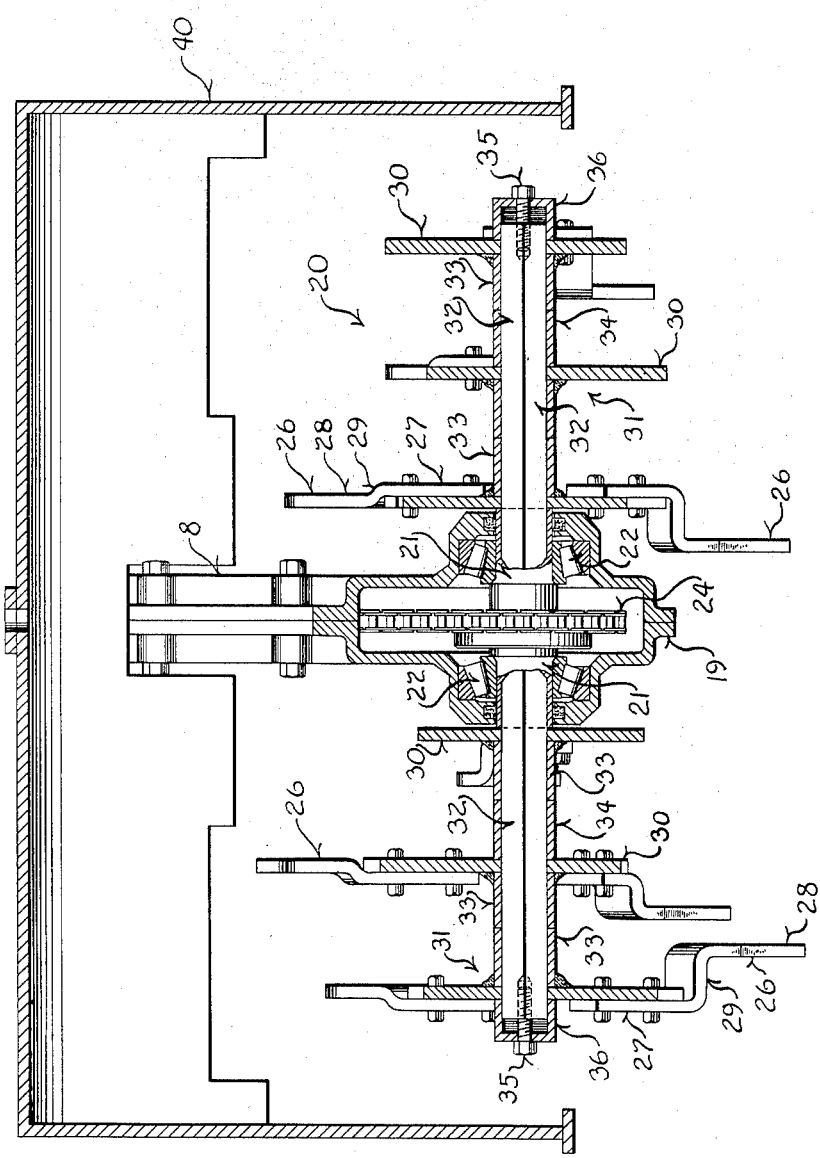
Figure 4 is a sectional view taken through Figure 2 on the plane of the line 4—4 but on an enlarged scale.

Also, as best shown in Figure 3, the tines are so disposed and arranged that the digging action of each individual tine may be characterized as an explosion of a relatively isolated and small piece of soil. This follows from the fact that each tine always strikes the "land" left between the axially spaced grooves cut by two preceding tines. Such exploding of these isolated "lands" greatly reduces the power requirements.

It is also important to observe that the tines of one set are angularly offset with relation to the tines of an adjacent set. Thus, a relatively wide space is afforded between adjacent tines to enable the smaller stones to pass between sets of tines.

As illustrated in Figure 6 the tines at each side of the machine are so mounted on the shaft 32 that their total number is equi-spaced around the full circle. Where the machine is designed to normally have three sets of tines at each side, as illustrated, the three tines of each set are spaced 120° apart; and by virtue of the angular offset between sets of tines one tine occurs every 20°.

To achieve the desired balance along the rotor the progressive engagement of the tines with the fresh soil occurs either simultaneously at both sides of the machine (in which case tine-ground engagement would occur every 40°) or preferably alternately at opposite sides as specifically shown in Figure 6 where the letters A, B and C indicate the sets of tines at one side of the machine and X, Y and Z indicate the sets of tines at the other side, while Roman numerals I to XVIII inclusive are employed to indicate the progression of tine-ground engagement. This latter arrangement has the advantage of lightening the load on the power plant as it is obviously easier to propel the tines through the soil one at a time than two at a time.

As is customary in machines of this type a hood 40 is disposed over the rotor to confine the soil being worked. This hood is pivotally supported at its forward end from the frame by a bolt 41 which passes through a pair of ears 42 on the hood and a tube 43 fixed to a supporting bracket 44 secured to the top of the frame. The bracket 44 also provides means for adjustably mounting the handles 18, as will be hereinafter described.

The pivotal mounting of the hood enables the lower end of the trailing portion 19 of the frame which carries the rotor to be raised and lowered, notwithstanding the fact that the hood 40 rides on top of the ground. However, the hood is employed to limit the extent to which the rotor may dig itself into the ground, which is its natural tendency resulting from the direction of rotation and the formation of its tines. To this end a link 45 pivoted as at 46 to the lower end of the housing portion, passes through a hole in the top of the hood. A bolt 47 inserted in one of the holes 48 in the upper end portion of the link limits the downward movement of the link with respect to the hood and thereby limits the descent of the rotor.

A stop abutment 49 fixed to the link 45 near its connection to the rotor provides means for lifting the hood off the ground when the rotor is raised to permit the machine being transported.

The novel features of the hood and the manner in which it is utilized to limit the depth to which the rotor digs are claimed in a copending application, Serial No. 609,818, filed August 9, 1945.

From the foregoing description, taken in connection with the accompanying drawings, it will be readily apparent to those skilled in the art, that this invention provides a rotary soil tiller having many advantages and desirable features, and that by virtue of its novel tine design and the balance of the machine, rigid tines rigidly mounted are made possible to thereby overcome one of the serious objections of all past rotary soil tillers.

What I claim as my invention is:

1. In an agricultural implement, a tool carrier adapted to be mounted on a power driven shaft, comprising: a relatively flat flange adapted to be drivingly connected with said shaft for rotation therewith in a plane normal to the shaft axis; and a plurality of rigid tines fixedly mounted on said flange, each having a flat inner extremity secured flatwise to one side of the flange and an entirely flat outer ground engaging portion parallel thereto and provided with a hook-shaped digging extremity, said ground engaging portion being adapted to travel edgewise, point first, through the ground, certain of said tines having intermediate portions remote from and disposed at an angle to their hook-shaped extremities to hold the same offset different distances whereby the hook-shaped extremities of the tines travel in separate axially spaced planes during rotation of the flange, said tines being arranged on the flange so that rotation thereof in use effects cutting of spaced apart grooves in the soil by the hook-shaped extremities of two of the tines and so that a third tine trailing said two tines engages the soil and strikes the land left between said grooves to substantially explode the earth comprising said land, and the tines being so positioned on the flange that the outer hook-shaped extremities of the tines trail their respective inner extremities to place the leading edges of the tines from the hook-shaped outer extremities of the tines to the inner extremities thereof at a substantial negative cutting angle, whereby weeds and other trash are easily thrown off the tines by centrifugal force during rotation of the carrier.

2. A ground working tool for a soil tilling device of the character described comprising: a tine carrier adapted to be rotated in one direction on a horizontal axis; three tines rigidly fixed on said carrier and projecting equal distances outwardly from the carrier with their outer extremities disposed in angularly equispaced relationship, each of said tines having an outer entirely flat ground engaging element comprising the major length of the projecting portion of the tine, the sides of said ground engaging elements being normal to the axis about which the carrier is adapted to rotate so that said ground engaging elements travel edgewise through the ground during rotation of the carrier, the outer extremity of each of said flat ground engaging elements curving outwardly toward a point facing in the direction of carrier rotation, and one of said tines having its outer ground engaging element offset to lie in a plane axially spaced from one side of the ground engaging element of a second tine on the carrier, the third tine having its outer ground engaging element offset to lie in a plane axially spaced from the opposite side of the ground engaging element on said second tine.

3. The ground working tool set forth in claim 2 further characterized by the fact that each of said tines has its entire leading edge, inwardly of the curved extremity of the tine, disposed at a substantial negative cutting angle.

4. In a soil tilling device of the type having a rotor shaft adapted to be rotated in one direction on a horizontal axis, a ground working tool for the rotor comprising: a disc-like tine carrier; means on the carrier for non-rotatably mounting the carrier on the shaft with the carrier normal to the shaft axis; and a rigid tine having a flat attaching portion at its inner end fixed flatwise to one face of the disc-like carrier, said tine extending outwardly from the carrier to have its outer extremity spaced a limited distance from the carrier axis so as to require the carrier to enter the ground when tilling to the maximum desired depth, substantially the entire outer projecting portion of said tine being entirely flat and normal to the carrier axis so that both the outer and the inner portions of the tine as well as the carrier disc travel edgewise through the soil during tilling to the maximum desired depth, the outer extremity of the tine being curved slightly in the direction of rotation and away from the carrier axis and pointed to facilitate entry of the tine into the ground, and the leading edge of the tine inwardly of its curved extremity being disposed at such a negative cutting angle that a radial line passing through the point of intersection between said leading edge and the periphery of the carrier disc intersects the arc of travel of the point on the tine a substantial distance from said point in the direction of rotation thereof, and the curve on the leading edge of the tine extremity being relatively slight so that trash and the like encountered by the tine during tilling is easily forced outwardly along said leading edge and off of the curved extremity of the tine thereby rendering the tine self-cleaning.

5. In an implement of the character described, a rotor comprising: a drive shaft adapted to be supported at its mid-portion for rotation on a substantially horizontal axis; and a group of axially spaced tool carriers mounted on the drive shaft at each side of said mid-portion of the shaft, each of said tool carriers including a flange mounted on the shaft to rotate therewith and disposed with its opposite side faces normal to the shaft axis, and a plurality of rigid tines fixedly mounted on the flange and projecting outwardly therefrom to provide entirely flat ground engaging portions for substantially the full projecting length of the tine, said ground engaging portions being parallel to one another and to said faces of the flange, and having angularly equispaced hook-shaped cutting portions on their extremities, the ground engaging and cutting portions of the tines of each group thereof being axially spaced along the shaft and so arranged with respect to one another as to be successively driven edgewise point foremost through the ground by rotation of the shaft, with no two tines of either group of carriers being brought into engagement with the ground at the same time, while each of the cutting portions of the tines between the endmost cutting portions of each group of carriers trails both of its axially adjacent cutting portions.

WALTER E. CLAUS.

REFERENCES CITED

The following references are of record in the file of this patent:

UNITED STATES PATENTS

| Number | Name | Date |
|---|---|---|
| 658,462 | Perry | Sept. 25, 1900 |
| 669,059 | Beall | Feb. 26, 1901 |
| 845,086 | Hoerhold | Feb. 26, 1907 |
| 967,189 | Hanson | Aug. 16, 1910 |
| 1,123,613 | Stevenson et al. | Jan. 5, 1915 |
| 1,135,305 | Linderblad | Apr. 13, 1915 |
| 1,279,689 | Harmon | Sept. 24, 1918 |
| 1,333,543 | Greene | Mar. 9, 1920 |
| 1,415,663 | Lilleberg | May 9, 1922 |
| 1,574,654 | Howard | Feb. 23, 1926 |
| 1,594,789 | May et al. | Aug. 3, 1926 |
| 1,637,098 | Barnes | July 26, 1927 |
| 1,680,866 | Funk | Aug. 14, 1928 |
| 1,742,563 | Stidger | Jan. 7, 1930 |
| 1,744,597 | Vasconcellos | Jan. 21, 1930 |
| 1,777,985 | Stuart | Oct. 7, 1930 |
| 1,951,701 | Major | Mar. 20, 1934 |
| 2,025,494 | Ariens | Dec. 24, 1935 |
| 2,214,702 | Seaman | Sept. 10, 1940 |
| 2,232,523 | Gray | Feb. 18, 1941 |
| 2,244,099 | Chase | June 3, 1941 |
| 2,287,479 | Kelsey | June 23, 1942 |
| 2,312,164 | Holzbock | Feb. 23, 1943 |
| 2,356,072 | Mahler | Aug. 15, 1944 |
| 2,364,666 | Seaman | Dec. 12, 1944 |
| 2,388,553 | Kraus | Nov. 6, 1945 |

FOREIGN PATENTS

| Number | Country | Date |
|---|---|---|
| 111,114 | Great Britain | July 25, 1918 |